United States Patent [19]

Abe

[11] Patent Number: 4,984,280

[45] Date of Patent: Jan. 8, 1991

[54] BILL DISCRIMINATING APPARATUS

[75] Inventor: Masakazu Abe, Moriguchi, Japan

[73] Assignee: Laurel Bank Machines Co., Ltd., Tokyo, Japan

[21] Appl. No.: 360,977

[22] Filed: Jun. 2, 1989

[30] Foreign Application Priority Data

Jun. 8, 1988 [JP] Japan ................................ 63-141022
May 26, 1989 [JP] Japan ................................ 1-134365

[51] Int. Cl.[5] ................................ G06K 9/32

[52] U.S. Cl. ................................ 382/7; 382/18; 382/46

[58] Field of Search ................ 302/7, 44, 46; 356/71; 382/18

[56] References Cited

U.S. PATENT DOCUMENTS 4,179,685 12/1979 O'Maley ................................ 382/46
4,441,205 4/1984 Berkin et al. ................................ 382/18
4,487,306 12/1984 Nao et al. ................................ 382/7

FOREIGN PATENT DOCUMENTS 0200486 9/1987 Japan ................................ 382/18
2035551 6/1980 United Kingdom .

*Primary Examiner*—Leo H. Boudreau
*Assistant Examiner*—David Fox
*Attorney, Agent, or Firm*—Fleit, Jacobson, Cohn, Price, Holman & Stern

[57] ABSTRACT

A bill discriminating apparatus including a detected data memory for temporarily storing data corresponding to at least one line of a bill photoelectrically detected by at least one scan of a photoelectrical detector, a control device for detecting the number of the detected data for each line of the bill to be stored in the detected data memory and detecting a condition of feeding based on the detected data of the first line of the bill to be stored in the detected data memory, a data count memory for storing the number of the detected data corresponding to each line of the bill detected by the control device, a bill feed condition memory for storing information detected by the control device and a detected pattern memory for storing the pattern of the bill based on the detected data stored in the detected data memory. The control device writes the detected data stored in the detected data memory in the detected pattern memory based on the number of the detected data corresponding to each line of the bill stored in the data count memory and the information stored in the bill feed condition memory so that rectangular patterns can be stored in the detected pattern memory.

3 Claims, 4 Drawing Sheets

BILL DISCRIMINATING APPARATUS

BACKGROUND OF THE INVENTION

The present invention relates to a bill discriminating apparatus, and more particularly, to such an apparatus capable of discriminating denominations, genuineness and/or condition of bills with high accuracy even in the case where the bills are fed with the edges thereof which should be oriented parallel to the bill feed direction actually oriented at an angle to the bill feed direction.

DESCRIPTION OF THE PRIOR ART

There are known bill discriminating apparatus for discriminating bill denomination, genuineness and/or condition (presence/absence of damage) of bills by scanning bills being fed along a bill feed path with light directed perpendicular to the bill feed direction, photoelectrically detecting light transmitted through or reflected by the bills by an image sensor to produce a detected pattern of the bills and comparing the thus produced detected pattern with bill reference patterns.

However, in this kind of bill discriminating apparatus, since the reference patterns are produced by scanning bills with light in their longitudinal direction or their widthwise direction, in the case where a bill is fed with the edges thereof which should be oriented parallel to the bill feed direction actually oriented at an angle to the bill feed direction (hereinafter referred to as "oblique travel"), it is impossible to discriminate their denominations, genuineness and condition by comparing the detected pattern produced by scanning bills with light in the direction perpendicular to the bill feed direction with the bill reference patterns.

Further, since it is extremely difficult to prevent oblique travel from occurring completely, it is practically impossible to discriminate denominations, genuineness and condition of bills with high accuracy with this kind of bill discriminating apparatus.

Under these circumstances, as disclosed in, for example, unexamined Japanese Patent Publication No. 54(1979)6437, there have been proposed bill discriminating apparatuses in which, when oblique travel occurs, the angle between the edges of the bills which should be oriented parallel to the bill feed direction and the bill feed direction is detected, the detected bill pattern is corrected by use of the thus detected angle and the thus corrected detected pattern is compared with the reference patterns, thereby to discriminate denomination, genuineness and condition of the bill.

However, in the proposed bill discriminating apparatus, it is necessary to provide detecting means for detecting the angle between the edges of bills and the bill feed direction, whereby the structure of the apparatus inevitably becomes complicated. Further, since the detected pattern data are normally corrected by data rotation, much time is required for correcting the detected pattern data. The proposed apparatus are therefore not suitable for practical use.

SUMMARY OF THE INVENTION

It is, therefore, an object of the present invention to provide a bill discriminating apparatus capable of discriminating denominations, genuineness and/or condition of bills with high accuracy even in the case where oblique travel occurs.

It is another object of the invention to provide such an apparatus which is simple in structure and uses a simple method of calculation for correction.

According to the present invention, the above and other objects can be accomplished by a bill discriminating apparatus having photoelectrical detecting means for scanning bills being fed along a bill feeding path with light in the direction perpendicular to the bill feeding direction and photoelectrically detecting light transmitted through or reflected by the bills and bill discriminating means for comparing a detected pattern produced based on an amount of light transmitted through or reflected by the bills detected by said photoelectrical detecting means with reference patterns and discriminating denominations, genuineness and/or condition of the bills, said bill discriminating apparatus comprising detected data storing means for temporarily storing data corresponding to at least one line of a bill photoelectrically detected by at least one scan of said photoelectrical detecting means, control means for detecting the number of said detected data for each line of the bills to be stored in said detected data storing means and detecting how the bill is being fed based on the detected data of the first line of the bill to be stored in said detected data storing means, data count storing means for storing the number of the detected data corresponding to each line of the bill detected by said control means, bill feed condition storing means for storing information on how the bill is being fed detected by said control means and detected pattern storing means for storing the pattern of the bill based on the detected data stored in said detected data storing means, said control means being constituted to be able to write the detected data stored in said detected data storing means in said detected pattern storing means based on the number of the detected data corresponding to each line of the bill stored in said data count storing means and the information on how the bill is being fed stored in said bill feed condition storing means so that rectangular patterns can be stored in said detected pattern storing means.

The above and other objects and features of the present invention will become apparent from the following description made with reference to accompanying drawings.

DESCRIPTION OF THE PREFERRED EMBODIMENTS

Figure 1:
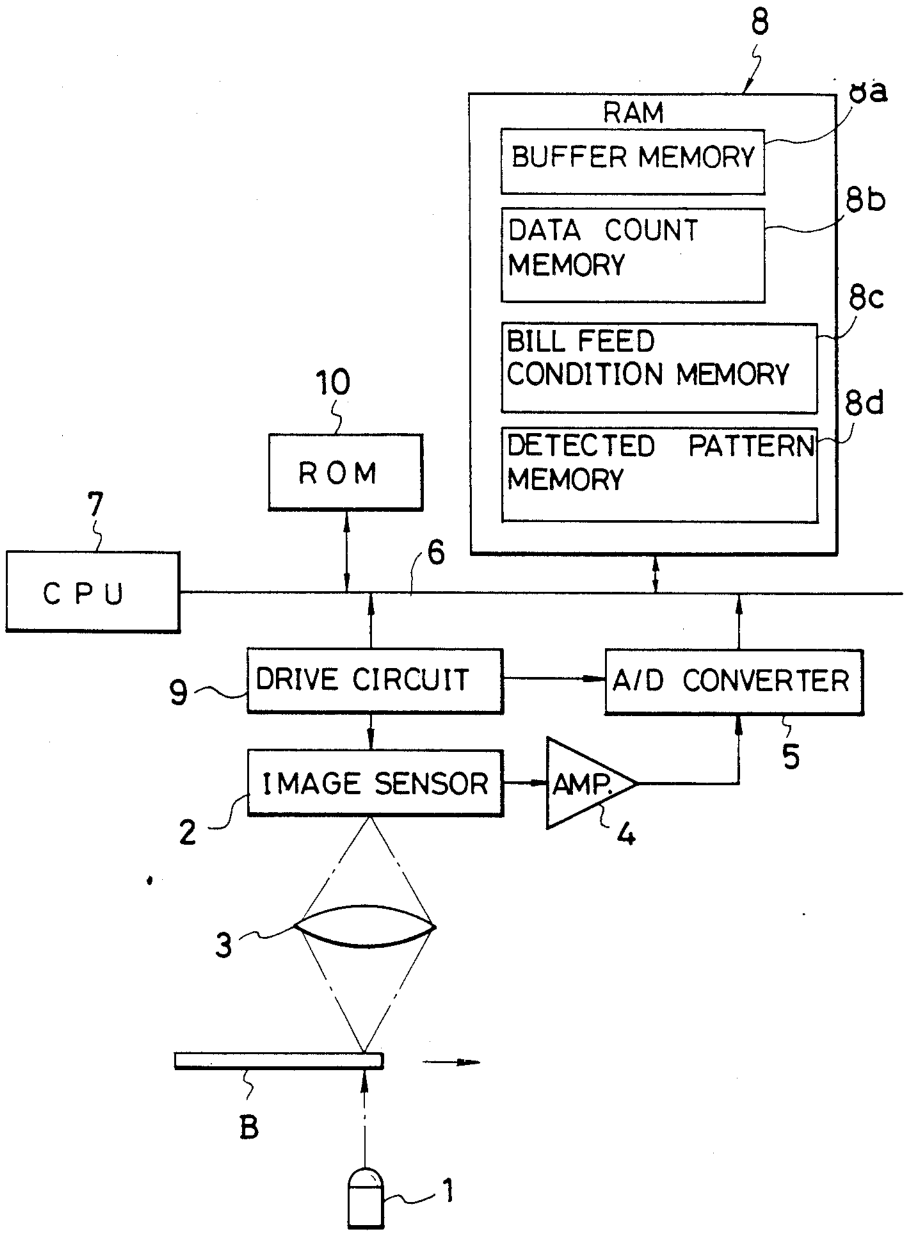
FIG. 1 is a schematic block diagram of a bill discriminating apparatus which is an embodiment of the present invention.

Referring to FIG. 1, a bill B is fed in the direction indicated by an arrow along a bill feeding path by a bill feeding means (not shown) in such a manner that the short edges thereof are oriented to be parallel to the bill feed direction and is linewise exposed to light emitted from a light source 1 in the direction perpendicular to the bill feeding path. The amount of light transmitted through the bill B is photoelectrically detected pixel by pixel along a direction perpendicular to the bill feeding path by an image sensor 2 disposed on the opposite side of the light source 1 across the transporting path and is converted to analog signals. The reference numeral 3 designates a lens. The bill B is fed across the image sensor 2 along the bill feeding path at a predetermined rate and, as a result, data on the amount of light transmitted through all pixels of the bill B are read out by the image sensor 2 and converted to analog signals. The detected signals of the bill B read out by the image sensor 2 are output at every scan of the image sensor 2, that is, each line of the bill B is output to an amplifier 4 to be amplified and further converted to digital signals by an A/D converter 5 to be output to a bus 6. The digital signals input to the bus 6 are output to a RAM 8 line by line by a CPU 7. The output of the image sensor 2 and, therefore, the output of the A/D converter 5 are set to be zero when the image sensor 2 detects no bill B.

The timing for read-out of data from the bill B conducted by the image sensor 2, line-by-line conversion of the analog signals to the digital signals conducted by the A/D converter 5 and line-by-line input of the digital signals to the RAM 8 conducted by the CPU 7 are controlled by timing signals output from a drive circuit 9 to the image sensor 2, the A/D converter 5 and the CPU 7.

The RAM 8 comprises a buffer memory 8*a* for storing the data on the pixels of one line of the bill B detected by one scan of the image sensor 2 and renewing them each time subsequent data are input, a data count memory 8*b* for storing the number of the detected data, namely the number of the pixels per line, calculated by the CPU 7 based upon the detected data when the detected pixel data for one line are input to the buffer memory 8*a*, a bill feed condition memory 8*c* for storing information on the bill feed condition detected by the CPU 7, that is, whether or not oblique travel has occurred and whether the front right edge of the bill B or the front left edge of the bill B leads in the case where the CPU detects that oblique travel has occurred when the detected pixel data for one line are input to the buffer memory 8*a*, and a detected pattern memory 8*d* for receiving the data stored in the buffer memory 8*a* line by line and storing a detected pattern of the bill B, the detected pattern memory 8*d* being capable of storing the detected pattern corrected by the CPU 7 in the case where the CPU 7 detects that oblique travel has occurred.

Figure 2:
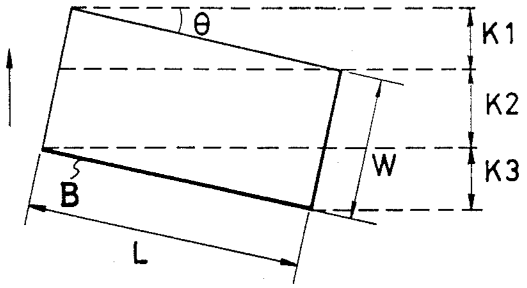
FIG. 2 is a schematic drawing showing how a bill may be transported.

In the case where the bill B is fed in such a manner that the edges thereof which should be oriented parallel to the bill feeding direction are actually oriented parallel to the bill feeding direction, that is, in the case where the bill B is being fed normally, the number of data per line of the bill B detected by one scan of the image sensor 2 and stored in the buffer memory 8*a* is always constant. Therefore, the number of detected data per line of the bill B stored in the data number memory 8*b* is always a constant value which depends upon the denomination of the bill B. On the other hand, in the case where the bill B is fed as shown in FIG. 2, the number of data detected for the first line of the bill B detected by one scan of the image sensor 2 and stored in the buffer memory 8*a*, that is, the number of data detected for the first line of the bill B is smaller than the number of data of the first line of any denomination of the bills B during normal feed of the bills. Therefore, the CPU 7 can detect whether or not oblique travel has occurred based upon the data detected for the first line of the bills B.

Further, supposing that the bills B are scanned by the image sensor 2 from the left to the right in FIG. 2 and the bill B is being fed in such a manner that the front left edge of the bill B leads as shown in FIG. 2, then the data detected for the first line are input to the buffer memory 8*a* so that zero is input over memory areas corresponding to some number of first pixels, data not equal to zero are input over memory areas corresponding to a subsequent number of pixels which is smaller than the number determined for each denomination of bills B, and then, zero is again input over memory areas corresponding a number of following pixels. Further, the number of zero data input into the buffer memory 8*a* is smaller in the preceding memory areas than in the following memory areas. Thus, based upon the data detected for the first line of the bill B, the CPU 7 detects that the front left edge of the bill B leads. In this manner, the CPU 7 can detect whether the front right edge or the front left edge of the bill B leads based upon the data detected for the first line of bill B.

In accordance with the data detected for the first line of the bill B, the CPU 7 detects whether or not oblique travel has occurred and when it judges that oblique travel has occurred, detects whether the front right edge of the bill B or the front left edge of the bill B leads. It then inputs the thus detected results to the bill feed condition memory 8*c*.

The reference numeral 10 designates a ROM in which control programs for controlling the bill discriminating apparatus, reference patterns for discriminating the denomination of bills B, reference patterns for discriminating the condition of bills B and the number of data per line of each denomination of bills B to be detected when bills B are being fed normally etc. are stored.

In the thus constituted bill discriminating apparatus which is an embodiment of the present invention, in the case where the bill B is fed in such a manner that the front left edge thereof leads and oblique travel occurs, the number of data detected for the first line of the bill B detected by one scan of the image sensor 2 and stored in the buffer memory 8*a*, that is, the number of data detected for the first line of the bill B increases gradually within a section K1 and is constant within a section K2 and then decreases gradually within a section K3.

Figure 3:
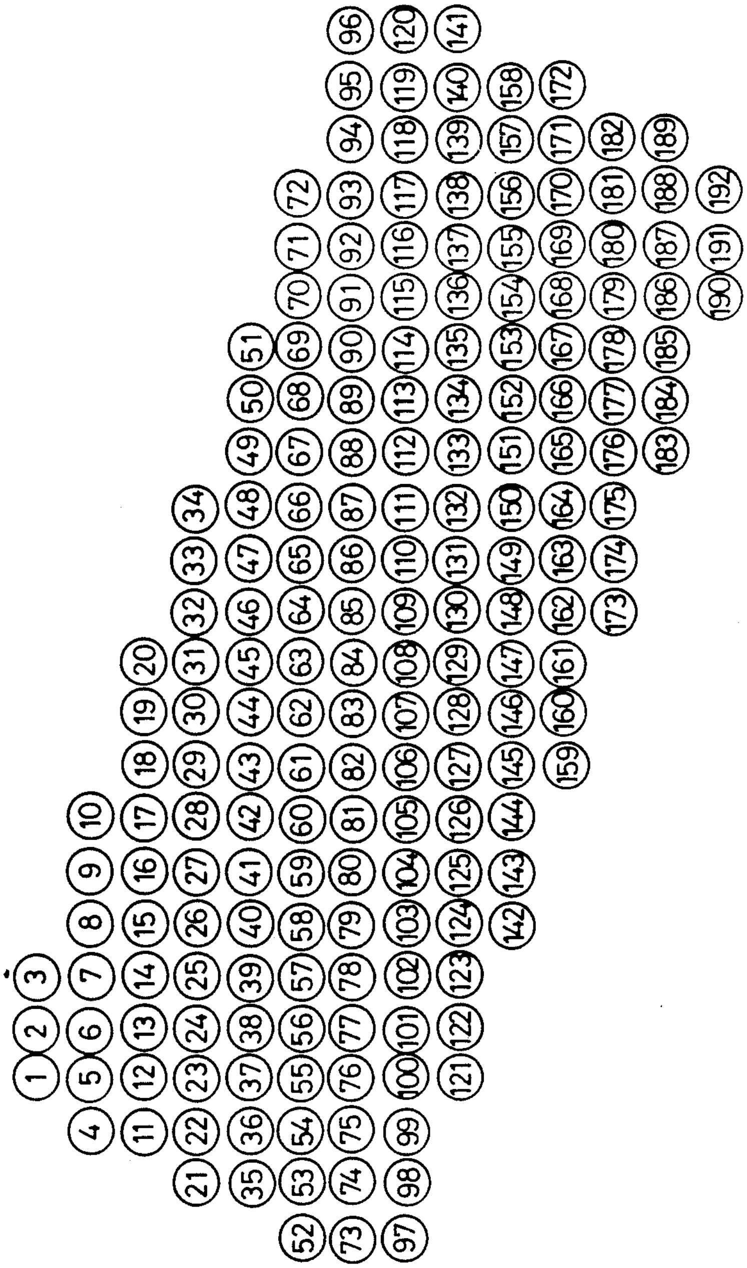
FIG. 3 is a schematic drawing showing a detected pattern of a bill detected by an image sensor.

In this case, the detected data of the bill B are stored in the buffer memory 8*a* of the RAM 8 in the order of the lines shown in FIG. 3. In connection with the data detected for the first line of the bill B, zero data are input for some number of first pixels as the detected data and detected data not equal to zero are subsequently input for three pixels and then zero data are again input for some number of pixels. As a result, since the number of zero data pixels is greater in the following memory areas than that in the preceding memory areas, the CPU 7 determines that oblique travel has occurred with the front left edge of the bill B leading and inputs the result of this determination into the bill feed condition memory 8*c*, while it inputs the data detected for the first line of the bill B into the buffer memory 8*a*. At the same time, the CPU 7 inputs the data number "3" into the data count memory 8*b* as the number (count) of the data detected for the first line.

Figure 4:
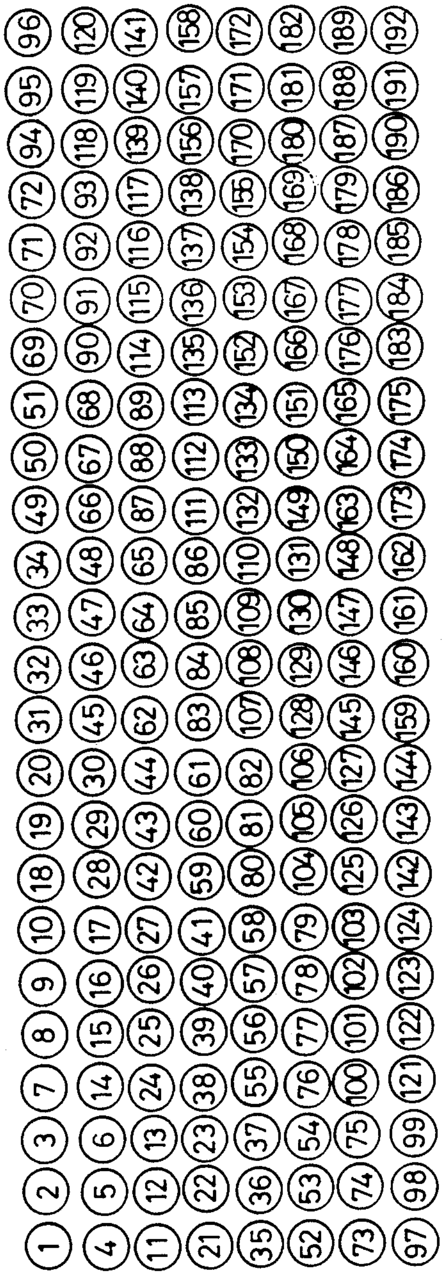
FIG. 4 is a schematic drawing showing a detected pattern of a bill stored in a detected pattern memory.

After the CPU 7 inputs the data detected for the first line of the bill B into the buffer memory 8*a*, it reads out the bill feed condition from the bill feed condition memory 8c. Then, in the case where oblique travel has occurred with the front left edge leading as shown in FIG. 2, the CPU 7 writes the data detected for the first line stored in the buffer memory 8a in the detected pattern memory 8d at the first line thereof so that they are stored from the left end of the first line of the detected pattern memory 8d successively as shown in FIG. 4. In FIG. 4, the first to third detected data are written at the first line of the detected pattern memory 8d from the left end thereof successively.

Then, when the data detected for the second line are input to the bus 6, the CPU 7 reads out the bill feed condition from the bill feed condition memory 8c and inputs the number "7" of the data detected for the second line into the data count memory 8b. At the same time, it compares the number of the data detected for the second line with that for the first line. As a result, since the number of the second line data is greater than that for the first line in FIG. 3, the CPU 7 writes the first three data detected for the second line, the number "3" of which is equal to that for the first line, in the detected pattern memory 8d at the second line thereof from the left end successively and after the number of the data written at the second line comes to equal that of the data written at the first line, the following data are written in the detected pattern memory 8d at the first line thereof from the left successively in such a manner that they immediately follow the data detected for the first line of the bills B written at the first line of the detected pattern memory 8d. In FIG. 4, the three data detected for the second line, the number "3" of which is equal to that of the data detected for the first line of the bill B, that is, the fourth to sixth data, are written at the second line of the detected pattern memory 8d from the left end thereof successively and the four data detected of the second line which are to be written after the detected data, the number of which is equal to that of the data detected for the first line of the bill B, have been written in the detected pattern memory 8d, that is, the seventh to tenth detected data, are written at the first line of the detected pattern memory 8d from the left successively in such a manner that they follow the third detected data written at the first line of the detected pattern memory 8d.

As a result, detected data, the number of which is equal to that of the data detected for the second line of the bill B detected by the image sensor 2 are written at the first line of the detected pattern memory 8d and detected data, the number of which is equal to that of the data detected for the first line of the bill B detected by the image sensor 2, are written at the second line of the detected pattern memory 8d.

Further, when the data detected for the third line of the bill B are input to the bus 6, the CPU 7 reads out the bill feed condition from the bill feed condition memory 8c and inputs the number of the data detected for the third line into the data count memory 8b. At the same time, it compares the number of the data detected for the third line with that for the second line. As a result, since the number of the data detected for the third line is greater than that for the second line in FIG. 3, the CPU 7 writes the first data detected for the third line, the number of which is equal to that for the first line in the detected pattern memory 8d, at the third line thereof from the left end successively and after the number of the data written at the third line comes to equal that of the data written at the first line, the following data detected for the third line of the bill B are written in the detected pattern memory 8d at the second line thereof from the left successively in such a manner that they follow the sixth detected data written at the second line of the detected pattern memory until the number of the detected data written at the second line of the detected pattern memory 8d becomes equal to that of the data detected for the second line of the bill B, and the remaining data detected for the third line of the bill B are written at the first line of the detected pattern data memory 8d from the left successively so that they follow the tenth detected data written at the first line of the detected pattern memory 8d. In FIG. 4, the eleventh to thirteenth detected data of the third line of the bill B detected by the image sensor 2 are written at the third line of the detected pattern memory 8d from the left end thereof successively, the fourteenth to seventeenth detected data of the third line of the bill B are written at the second line of the detected pattern memory 8d from the left successively in such a manner that they follow the sixth detected data written at the second line of the detected pattern memory 8d and the eighteenth to twentieth detected data of the third line of the bill B are written at the first line of the detected pattern memory 8d from the left successively so that they follow the tenth detected data written at the first line of the detected pattern memory 8d.

As a result, detected data, the number of which is equal to that of the data detected for the third line of the bill B detected by the image sensor 2 are written at the first line of the detected pattern memory 8d, detected data, the number of which is equal to that of the data detected for the second line of the bill B detected by the image sensor 2 are written at the second line of the detected pattern memory 8d, and detected data, the number of which is equal to that of the data detected for the first line of the bill B detected by the image sensor 2 are written at the third line of the detected pattern memory 8d.

Thus, in the case where the detection is made within the section K1 where the number of the detected data increases gradually, the data detected for ith line of the bill B (i being a positive integer) detected by the image sensor 2 are written in the detected pattern memory 8d so that first detected data are written at the ith line of the detected pattern memory 8d from the left end successively until the number thereof becomes equal to that of data detected for the first line of the bill B and the following data detected for the ith line of the bill B are written at the $(i-1)$th of the detected pattern memory 8d from the left successively until the number thereof becomes equal to that of the data detected for the second line of the bill B and, generally speaking, at the $(i-j)$th line of the detected pattern memory 8d (j being a positive integer smaller than i), the data detected for the ith line of the bill B are written from the left successively until the number thereof becomes equal to that of the data detected for the $(j+1)$th line of the bill B.

As described above, the detecting, storing and writing operation is repeated for writing the detected data of the bill B in the detected pattern memory 8d. Supposing that the detection of bill B in the section K1 is completed at the kth line of the bill (k being a positive integer greater than i), then, the data detected for the kth line of the bill B are written in the detected pattern memory 8d in such a manner that the detected data, the number of which is equal to that of the data detected for the kth line of the bill B are written at the first line of the detected pattern memory 8d, the detected data, the number of which is equal to that of the data detected for the (k−1)th line of the bill B are written at the second line of the detected pattern memory 8*d*, the detected data, the number of which is equal to that of the data detected for the (k−2)th line of the bill B are written at the third line of the detected pattern memory 8*d* and, generally, at the (l+1)th line of the detected pattern memory 8*d* (l being a positive integer smaller than k), the detected data, the number of which is equal to that of the data detected for the (k−1)th line of the bill B are written.

Therefore, when the detection of the bill B in the section K1 has been completed at the kth line of the bill B and the data detected for the kth line of the bill B have been written in the detected pattern memory 8*d*, detected data, the number of which is equal to that of the data detected for the kth line of the bill B, that is, the maximum number of detected data for one line of the bill B, as shown in FIG. 2, have been written at the first line of the detected pattern memory 8*d*. As a result, the data detected for the (K+1)th line of the bill B are not written at the first line of the detected pattern memory 8*d* and they are written such that the writing operation for writing the data detected for the (k+1)th line of the bill B is completed when they have been written at the second line of the detected pattern memory 8*d*. Thus, in the case where the detection of the bill B is made within the section K2, the data detected for the mth line of the bill B (m being a positive integer greater than k) are written in such a manner that first detected data are written at the mth line of the detected pattern memory 8*d* from the left end thereof successively until the number of the detected data written at the mth line becomes equal to that of the data detected for the first line of the bill B and that, generally, the detected data are written at the (m-n)th line of the detected pattern memory 8*d* (n being a positive integer smaller than k) subsequently to the data detected for the (m−1)th line of the bill B written at the (m-n)th line from the left successively. As a result, detected data, the number of which is equal to that of the data detected for the kth line of the bill B, the maximum number of the data detected for one line of the bill B, are written at the first line to the (m−k+1)th line of the detected pattern memory 8*d*.

Further, supposing that the detection of the bill B in the section K3 is started at the pth line of the bill B (p being a positive integer greater than m), then, the data detected for the pth line of the bill B are written in the detected pattern memory 8*d* in such a manner that first detected data are written at the (p−1)th line of the detected pattern memory 8*d* subsequently to the data detected for the (p−1)th line of the bill B from the left successively until the number of the detected data written at the (p−1)th line of the detected pattern memory 8*d* becomes equal to that of the data detected for the second line of the bill B, that the following data detected for the pth line of the bill B are written at the (p−2)th line of the detected pattern memory 8*d* subsequently to the data detected for the (p−1)th line of the bill B from the left successively until the number of the detected data written at the (p−2)th line of the detected pattern memory 8*d* becomes equal to that of the data detected for the third line of the bill B, and that, generally, the data detected for the pth line of the bill B are written at the (p-q)th line of the detected pattern memory 8*d* (q being a positive integer smaller than k) subsequently to the data detected for the (p−1)th line of the bill B from the left successively until the number of the detected data written at the (p-q)th line of the detected pattern memory 8*d* becomes equal to that of the data detected for the (q+1)th line of the bill B.

Thus, in the case where the detection of the bill B is being made within the section K3, the data detected for the (p+r)th line of the bill B (r being a positive integer) are written at the (p−s+1)th line of the detected pattern memory 8*d* (s being a positive integer not smaller than 2) subsequently to the data detected for the (p+r−1)th line of the bill B written at the (p−s+1)th line from the left successively until the number of the detected data written at the (p−s+1)th line of the detected pattern memory 8*d* becomes equal to that of the data detected for the (r+s)th line of the bill B.

Figure 5:
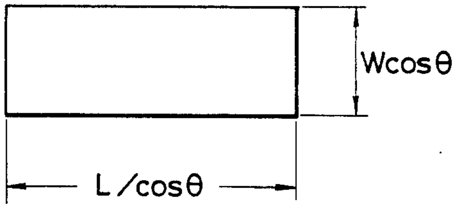
FIG. 5 is a schematic drawing showing the shape of a detected pattern of a bill stored in a detected pattern memory.

As described above, when the detection of data has been completed for a whole area of the bill B, a rectangular pattern is stored in the detected pattern memory 8*d* as shown in FIG. 4. As shown in FIG. 5, although the pattern of the detected data thus stored in the detected pattern memory 8*d* has a rectangular shape similarly to that of the bill B, the length and width thereof are different from the length L and the width W of the actual bill B. More specifically, supposing that the angle between the edges of the bill B which should be oriented parallel to the bill feed direction and the bill feed direction is $\theta$, then, the length of the stored pattern of the detected data is $L/\cos\theta$ and the width thereof is $W\cos\theta$, respectively.

In the above, an explanation was made as to only the case of oblique travel in which the front left edge of the bill B leads. In the case where oblique travel occurs with the front right edge of the bill B leading, the detected data of the bill B are processed by the CPU 7 to be written in the detected data memory 8*d* so that the direction of writing is reversed left and right with respect to that in the foregoing description.

Further, in the case where the bill B is fed with the edges thereof which should be oriented parallel to the bill feed direction actually oriented parallel to the bill feed direction and no oblique travel occurs, since the bill feed condition memory 8*c* stores the information that the bill feed condition is normal, the CPU 7 inputs and writes the detected data stored in the buffer memory 8*a* line by line from the first line into the detected pattern memory 8*d* without conducting any special processing of the type described above.

After the detection of the bill B has been completed, the CPU 7 reads out the pattern of the detected data stored in the detected pattern memory 8*d* of the RAM 8 therefrom and also reads out the bill reference patterns from the ROM 10. Then it discriminates the denomination, genuineness and condition of the bill B by comparing them and outputs the result of discrimination to a display means (not shown).

As described above, since the pattern of the detected data stored in the detected pattern memory 8*d* has a rectangular shape as shown in FIGS. 4 and 5, it is possible to discriminate the denomination, genuineness and condition of the bill B by comparing the stored pattern with the bill reference patterns line by line.

However, as shown in FIG. 5, although the pattern of the detected data stored in the detected pattern memory 8*d* has a rectangular shape, since the length and width thereof are different from those of the actual bill B, the data of each line of the pattern stored in the detected pattern memory 8*d* does not completely agree with that of any of the bill reference patterns. Nevertheless, since some tolerance is allowed for discriminating the denomination, genuineness and condition of bills B and bills B are discriminated as genuine and undamaged bills of a certain denomination if the detected pattern agrees with one of the bill reference patterns over greater than a predetermined part thereof, even if they do not completely agree with each other, such disagreement does not affect the accuracy for discriminating bills B.

According to the above described embodiment, the CPU 7 detects from the first line data of the bill B detected by the image sensor 2 whether or not oblique travel has occurred, then in the case where oblique travel has been detected to occur, detects whether the front left edge or the front right edge of the bill B leads, and further detects the number of the data detected for each line of the bill B based upon the data detected by the image sensor 2 and in accordance with the result of these detections, it writes the detected data stored in the buffer memory 8a in the detected pattern memory 8d so that the rectangular pattern can be stored. Thus, since the denomination, genuineness and condition of bills B can be discriminated with high accuracy by only comparing the thus stored pattern of the detected data with the bill reference patterns, it is neither necessary to separately provide a means for detecting the angle between the edges of the bill B to be oriented parallel to the bill feed direction and the bill feed direction nor conduct complicated calculation such as data rotation. Therefore, it is possible to provide a bill discriminating apparatus of simple structure which is capable of discriminating the denomination, genuineness and condition of bills B with high accuracy by a simple calculation even in the case where oblique travel occurs.

As described in detail with reference to the preferred embodiment, according to the present invention, it is possible to provide a bill discriminating apparatus of simple structure which is capable of discriminating the denomination, genuineness and condition of bills B with high accuracy by a simple calculation even in the case where oblique travel occurs.

The present invention has thus been shown and described with reference to a specific embodiment. However, it should be noted that the present invention is in no way limited to the details of the described arrangements but changes and modifications may be made without departing from the scope of the appended claims.

For example, in the above described embodiment, although the image sensor photoelectrically detects light transmitted through the bill B, it may detect light reflected from the bill B.

Further, in the above described embodiment, although the bill B is exposed to light emitted from the light source 1 line by line and light transmitted through the bill B is detected pixel by pixel by the image sensor 2 along the traverse line perpendicular to the bill feeding path, it is possible to scan the bill B point by point by the light source 1 along the line perpendicular to the bill feeding path and to photoelectrically detect light transmitted through or reflected by the bill B.

Moreover, in the above described embodiment, although the buffer memory 8a is constituted so as to store one line of data of the bill B detected by one scan of the image sensor 2 and renew the stored data each time data detected for a subsequent line of the bill B are input, it will be understood that while it is sufficient for the buffer memory 8a to be able to store only the data detected for a single line of the bill B, it may of course be arranged to be capable of storing the data detected for two or more lines of the bill B.

What is claimed is:

1. A bill discriminating apparatus having photoelectrical detecting means for scanning bills being fed along a bill feeding path with light in the direction perpendicular to the bill feeding direction and photoelectrically detecting light transmitted through or reflected by the bills and bill discriminating means for comparing a detected pattern produced based on an amount of light transmitted through or reflected by the bills detected by said photoelectrical detecting means with reference patterns and discriminating denominations, genuineness and/or condition of the bills, said bill discriminating apparatus comprising detected data storing means for temporarily storing data corresponding to at least one line of a bill photoelectrically detected by at least one scan of said photoelectrical detecting means, control means for detecting the number of said detected data for each line of the bill to be stored in said detected data storing means and detecting a condition of feeding of the bill based on the detected data of the first line of the bill to be stored in said detected data storing means, data count storing means for storing the number of the detected data corresponding to each line of the bill detected by said control means, bill feed condition storing means for storing information detected by said control means and detected pattern storing means for storing the pattern of the bill based on the detected data stored in said detected data storing means, said control means being able to write the detected data stored in said detected data on the number of the detected data corresponding to each line of the bill stored in said data count storing means and the information stored in said bill feed condition storing means so that rectangular patterns can be stored in said detected pattern storing means.

2. A bill discriminating apparatus in accordance with claim 1, wherein said control means is able to detect whether or not an oblique trouble occurs and whether a front left edge of said bills or a front right edge of the bills is precedent and inputting the thus detected result into said bill feed condition storing means.

3. A bill discriminating apparatus in accordance with claim 1, wherein said control means detects when oblique travel occurs when the number of detected data greater than zero for the first line of the bill is smaller than a predetermined number.

* * * * *